United States Patent [19]

Eveanowsky, Jr. et al.

[11] Patent Number: 5,022,341

[45] Date of Patent: Jun. 11, 1991

[54] HORN

[76] Inventors: Stanley J. Eveanowsky, Jr., 724 Jackson Ave., Magnolia, N.J. 08049; Mark J. Whitley, 232 Washington Ave., Pitman, N.J. 08071

[21] Appl. No.: 597,174

[22] Filed: Oct. 15, 1990

[51] Int. Cl.[5] .......................... G10K 9/04; G10K 9/22

[52] U.S. Cl. .......................... 116/142 FP; 116/142 R; 219/201; 340/387

[58] Field of Search .................... 116/142 R, 142 FP; 219/201, 202; 340/387; 381/156, 189, 124; 181/149

[56] References Cited

U.S. PATENT DOCUMENTS

| | | | |
|---|---|---|---|
| 1,614,858 | 1/1927 | Wenz | 116/142 FP |
| 1,910,545 | 5/1933 | Hewitt et al. | 116/137 R |
| 1,926,688 | 9/1933 | Schaal | 116/137 |
| 2,173,951 | 9/1939 | Patterson | 116/142 FP |
| 2,299,447 | 10/1942 | Wood | 116/137 |
| 2,386,513 | 10/1945 | Soderberg | 116/142 |
| 2,409,954 | 10/1946 | Pearson | 219/201 |
| 2,646,029 | 7/1953 | Holmberg et al. | 123/169 |
| 2,660,656 | 11/1953 | Wilkie | 219/209 |
| 2,790,164 | 4/1957 | Oberg | 340/388 |
| 2,918,558 | 12/1959 | Evans | 219/20 |
| 3,146,449 | 8/1964 | Serge et al. | 343/704 |
| 3,234,501 | 2/1966 | Hagen et al. | 340/387 |
| 3,402,280 | 9/1968 | Grigg | 219/209 |
| 3,632,965 | 1/1972 | Guth et al. | 219/209 |
| 4,317,009 | 2/1982 | Shintaku | 381/156 |
| 4,891,796 | 1/1990 | Sekine | 367/96 |

FOREIGN PATENT DOCUMENTS

| | | | |
|---|---|---|---|
| 0154256 | 9/1985 | European Pat. Off. | 181/149 |

*Primary Examiner*—William A. Cuchlinski, Jr.
*Assistant Examiner*—W. Morris Worth
*Attorney, Agent, or Firm*—Marvin C. Gaer

[57] ABSTRACT

A vehicle air horn is disclosed which is provided with heating cartridges and a temperature sensing switch. The temperature sensing switch automatically turns the heating cartridges on and off at predetermined temperatures. This automatic heating facility enables the horn to remain operational at low temperatures in inclement weather when other unheated horns would be expected to fail.

14 Claims, 4 Drawing Sheets

15
18
28
26
8
27
9
10
21
42
37
39
38
13
40
19
14
33
31
29
43
44
16
11
12
35

HORN

This invention is concerned with vehicle horns and in particular with horns which will operate at low temperatures and in inclement weather.

BACKGROUND OF THE INVENTION

A common problem experienced by truck operators is the failure of their truck air horns to function properly at low temperatures or when there has been an accumulation of ice and snow on and in the horn. These horns usually must be mounted on the outside of the truck and are thus unavoidably exposed to the elements. Horn failures often occur without warning creating a serious safety problem, since the vehicle operators may only become aware of this malfunction when they are unable to sound the horn to avert an impending collision. Furthermore, even if drivers do become aware of the failure of the truck horn to operate in advance of an emergency situation, they may still be unable to correct the problem in any practical way without halting their trip, thus falling behind schedule and being put to great inconvenience and expense.

The horn malfunctioning is usually due to the freezing of the sounding diaphragm or the accumulation of ice and snow blocking the flow of air through the horn or muffling the horn sound. On ships and trains this problem may be alleviated by powering the horns with hot steam, but this is not available to trucks.

SUMMARY OF THE INVENTION

This invention discloses a low cost, heatable horn capable of operating reliably at very low temperatures and when exposed to freezing moisture, ice and snow. In the embodiment described herein, an air horn is constructed of a metal housing which is provided with hollow channels into which can be inserted electrical cartridge heaters and a thermistor sensor. These heater cartridges are activated by a switch connected to the thermistor sensor which switches on electricity to the cartridges when the inner temperature of the housing falls below a predetermined level sensed by the thermistor. The heater cartridges are energized through the electrical power system of the vehicle.

Tests on prototypes of the invention confirm that such heated air horns will continue operating reliably down to temperatures far below those at which ordinary, unheated horns would be expected to fail.

It is also to be noted that although this invention is described in terms of air horns, the same principles may apply with appropriate modifications to other types of horns.

Thus, the principal object of this invention is to provide a heatable vehicle horn which will operate reliably at low and freezing temperatures and in the presence of ice and snow.

A further object of this invention is to provide a horn in which the heating elements of the horn become activated or deactivated automatically at predetermined temperatures without the intervention of the vehicle operator.

A further object of this invention is to increase the margin of safety for individuals using the roadways by providing a more reliable horn warning device to avoid collisions and other dangerous situations.

A further object of this invention is to provide a horn which will remain operative in cold, inclement weather without requiring the vehicle operator to halt his trip in order to try to keep his vehicle horn in proper working order.

These and other objects will be apparent to those skilled in the art from the description and claims which follow.

BRIEF DESCRIPTION OF THE DRAWINGS

The more specific objects, features and advantages of this invention will be more readily apparent from the following description wherein reference is made to the accompanying drawings illustrating a preferred embodiment of the invention.

In the drawings.

DETAILED DESCRIPTION OF A PREFERRED EMBODIMENT

Figure 1:
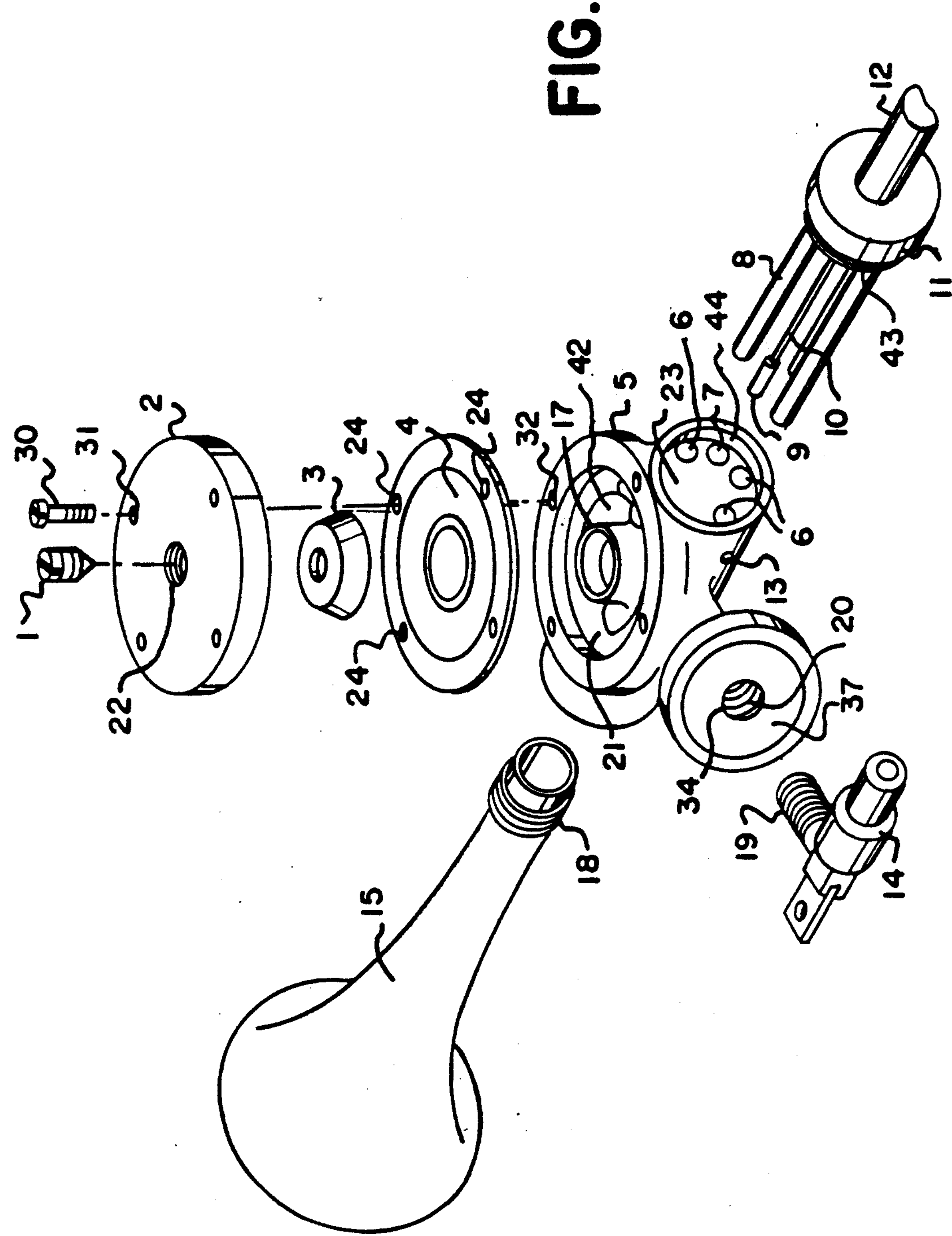
FIG. 1 is an exploded perspective view of the horn.

Although a specific embodiment of the invention has been illustrated in the drawings and the following description is presented in reference to this embodiment, this description is not intended to limit the scope of the invention which is defined in the appended claims.

FIG. 1 presents an exploded view of the air horn to be described. Here a sound emitting mechanism, the flared metal trumpet 15, is shown directed forward and contains outer threads 18 for attachment to inner threads provided therefor in the metal diaphragm housing 5. The sound generating mechanism, a semi-pliable essentially flat disk diaphragm 4, rests on the diaphragm pedestal 17 centered inside the concave circular diaphragm chamber 21 of the diaphragm housing 5, this chamber opening upward. The diaphragm pedestal 17 opens into a hollow sound chamber 28, shown in FIG. 2, below the diaphragm chamber 21. The sound chamber opens forward into the trumpet 15.

Tension on the diaphragm 4 can be adjusted to produce varying degrees of pitch by turning a pitch tuning adjuster screw 1, which is screwed through the pitch tuning adjuster aperture 22 which is provided in the diaphragm head cover 2 and which contains inner threads matched to those of the pitch tuning adjuster screw 1. The head cover 2 is attached to the diaphragm by four screws 30 (only one shown in FIG. 1) passing through screw holes 31 in the diaphragm head cover 2, and through screw holes 24 in the diaphragm 4, before being screwed, into threaded holes 32 provided therefor on the circular edge of the diaphragm housing 5. The pitch tuning adjuster screw 1 presses against the diaphragm tension cap 3 which is situated between the diaphragm head cover 2 and the diaphragm 4, and presses the diaphragm against the diaphragm pedestal 17.

Figure 2:
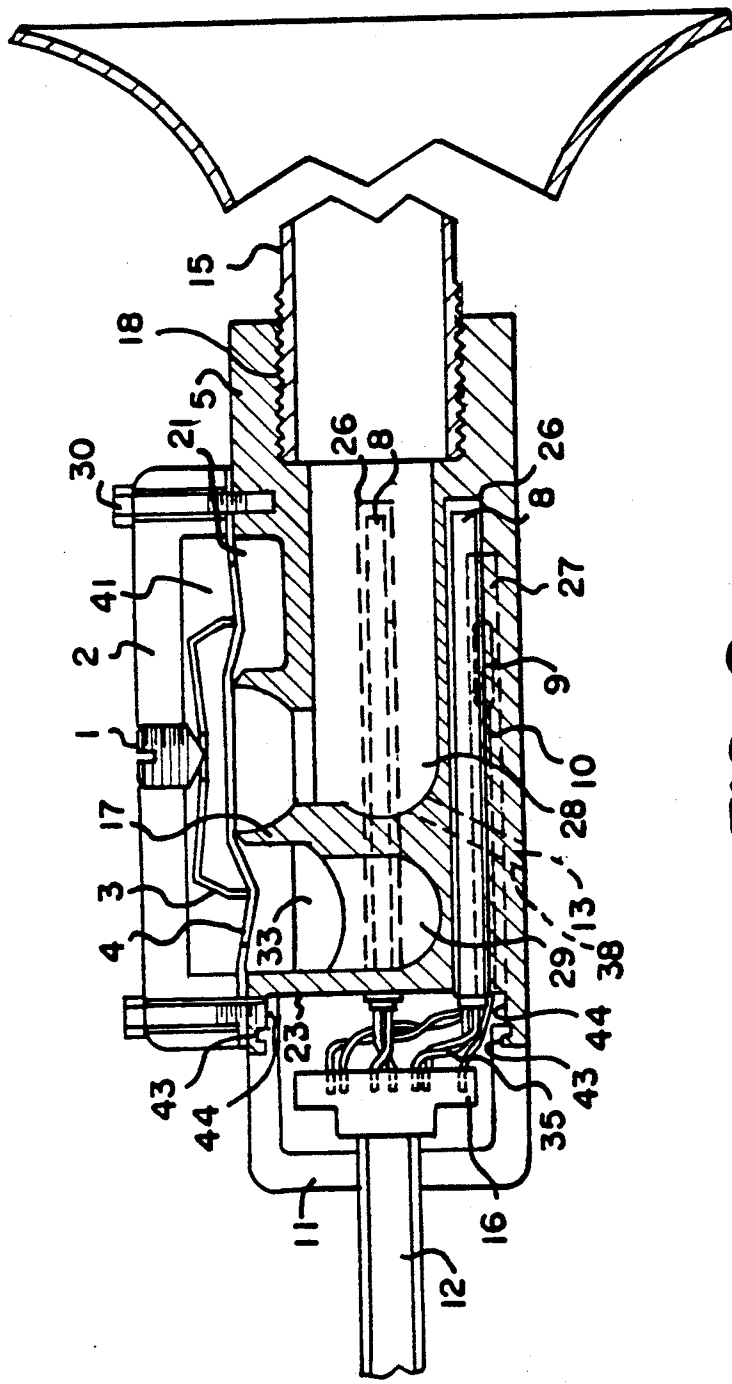
FIG. 2 is a cut away side view of the assembled horn.
Figure 3:
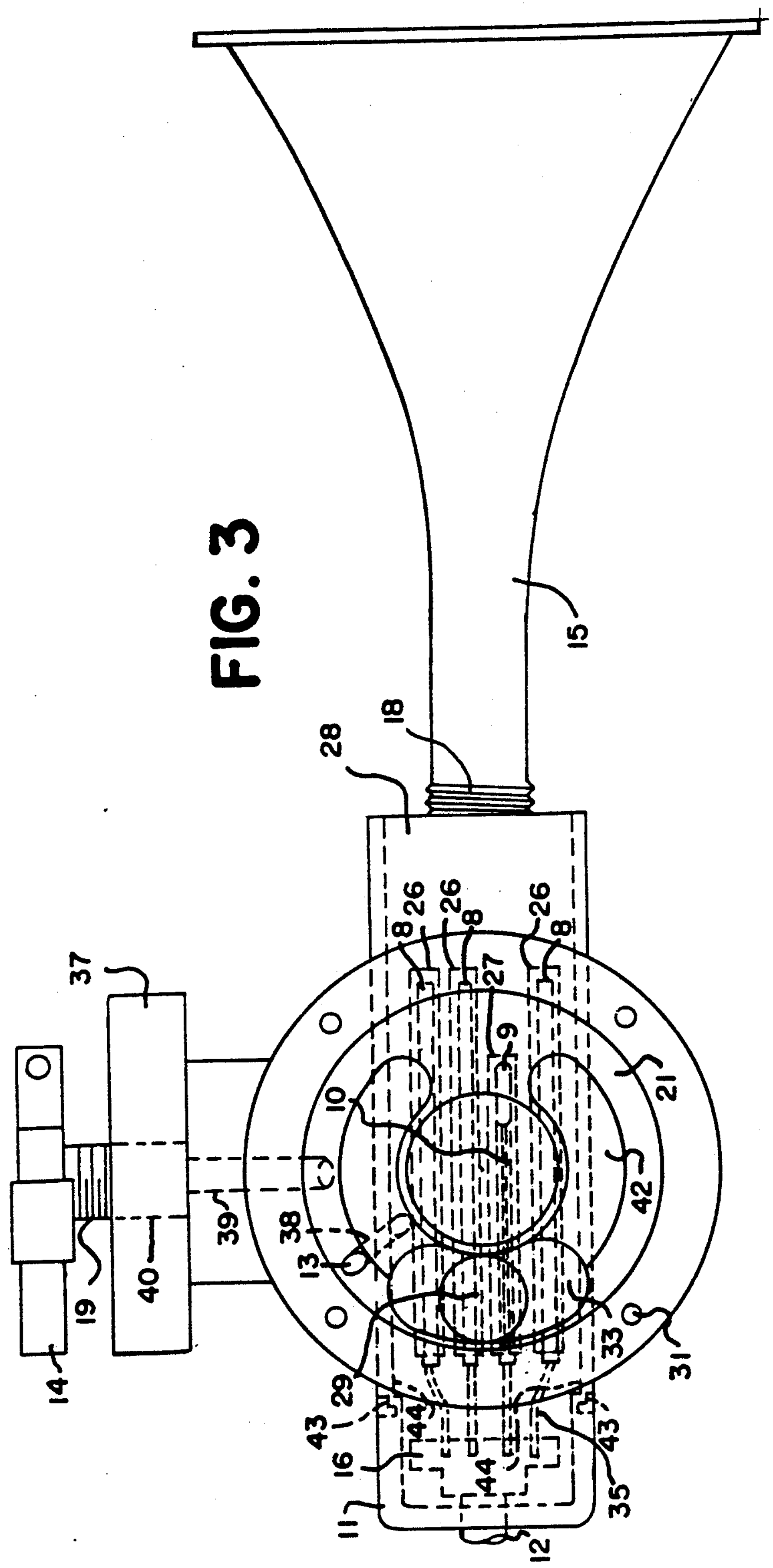
FIG. 3 is a cut away top view of the assembled horn.

Air under pressure to actuate vibrations in the diaphragm 4 is supplied by an air compressor. This high pressure air is delivered to the diaphragm 4, through the main pressure control valve 14, which connects to the diaphragm housing 5 at the air valve port 34 located in pressure port housing 37, shown in FIG. 1 and FIG. 3. This compressed air passes through the air channel 40 shown in FIG. 3 through the connecting tube 39 into the diaphragm chamber 21 located below the diaphragm 4 in the diaphragm housing 5 as shown in FIGS. 1, 2, and 3. Outer threads 19 on the pressure control valve 14 and inner threads 20 at the air valve port 34 provide a means for connecting this valve at the valve port 34. Other compressed gases might also be used when available instead of air.

The diaphragm 4 is a semi-pliable essentially flat disk constructed of a high density plastic such as polypropylene. The diaphragm housing 5, diaphragm head cover 2, tension cap 3 and pressure valve 14 are all constructed of good heat conducting materials, preferably metal such as aluminum or an aluminum alloy. The trumpet 15 is to be constructed of a metal such as stainless steel. A drain hole 13 is provided in the diaphragm housing 5 to allow the escape of accumulated moisture. This drain hole 13 connects to the sound chamber 28 via a drain channel 38 passing through the base of the diaphragm housing 5 as shown in FIGS. 2 and 3.

Interconnecting chambers 29, 33, and 42, as shown in FIGS. 1, 2, and 3 are sized to produce a desired tone quality. The air space 41 above the diaphragm 4 in the diaphragm chamber 21, as shown in FIG. 2, remains at approximately atmospheric pressure and serves to balance the compressed air pressure on the diaphragm 4 entering from below.

In the circular recessed housing wall 23, shown in FIGS. 1, 2, and 3, are three apertures 6, heating ports, opening into three parallel tubular heating cartridge channels 26 in the diaphragm housing 5, shown in FIG. 2 and FIG. 3. Also, in the housing wall 23, there is an aperture 7, the thermistor port, opening into a fourth thermistor channel 27 in the housing 5, also shown in FIG. 2 and FIG. 3 running parallel to the channels 26.

FIG. 2 and FIG. 3 indicate that channels 26 extend forward to a close proximity with the base of the trumpet 15. Each of the three channels 26 has inserted into it one of the three cylindrical heating cartridges 8. Similarly channel 27 will have inserted into it a thermistor 9 at the tip of the thermistor stem 10. FIG. 2 and FIG. 3 illustrate the geometric relation of these four tubular channels with various parts of the diaphragm housing 5. The heating cartridges 8 and thermistor 9 are connected to the electronic controls in the electronic housing 16 in the electronic housing cap 11, shown in FIGS. 1, 2, and 3, by the electronic control wires 35.

Figure 4:
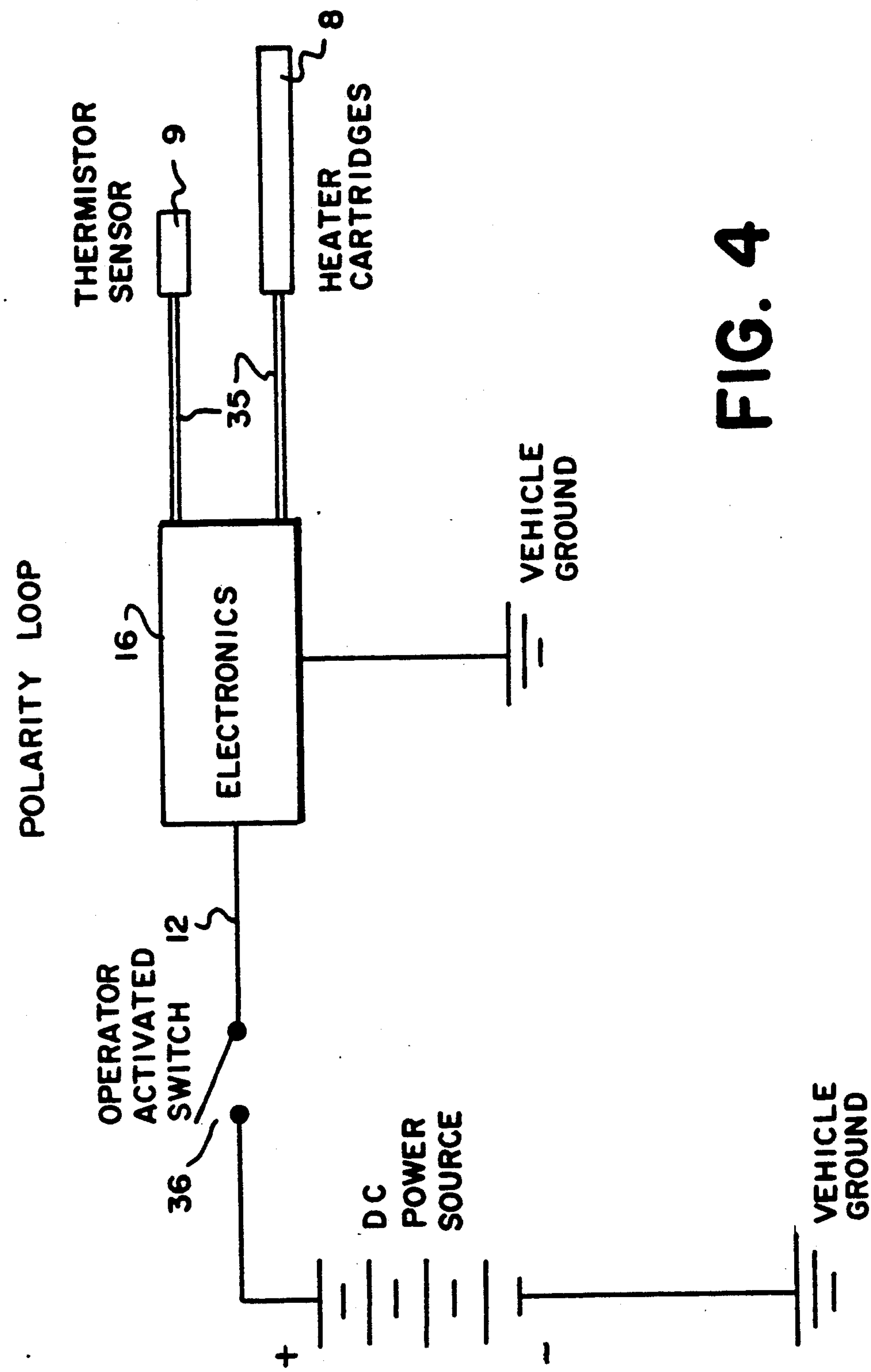
FIG. 4 is a schematic of the electrical polarity loop or circuit loop of the horn.

FIG. 4 is a circuit schematic illustrating the polarity loop of the electrical energy system of the horn. As illustrated in FIG. 4, the heating cartridges 8 and thermistor sensor 9 are attached to the electronic controls 16 via the wires 35. The vehicle battery provides a source of D.C. power through the power cables 12. An operator controlled switch 36 allows the vehicle operator to activate the system when the weather requires it.

As indicated in FIGS. 1, 2, and 3, the electronic housing cap 11 and circular housing wall 23 are equipped with mating flanges 43 and 44 respectively which provide means to attach the housing cap 11 snugly to the circular housing wall 23 when the heating cartridges 8 and thermistor 9 are inserted into their respective channels.

FIGS. 2 and 3 show all the horn elements in their operating positions. When the temperature is low enough, a thermistor activated switch in the electronic controls 16 turns on the heating cartridge 8.

The heat supplied is conducted throughout the horn, warming the diaphragm 4, trumpet 15 and housing 5, maintaining them in operating condition and preventing the excessive accumulation of snow and ice in and on the horn.

The thermistor 9, in one embodiment, is to operate via a negative thermal coefficient microprocessor switch which turns the heating cartridges 8 on and off at predetermined temperatures. Other heat sensitive switching mechanisms, however, would perform as well when properly adjusted to the apparatus.

Also, instead of the heating cartridges 8, properly sized foil heaters could also be used to heat the horn.

Although this invention has been illustrated and demonstrated in connection with a particular embodiment thereof, it will be apparent to those skilled in the art that various changes and modifications may be made therein without departing from the spirit of the invention or from the scope of the appended claims.

What is claimed is:

1. A horn apparatus consisting of a housing to which is attached a sound emitting element, said housing to containing a sound generating mechanism; said housing to having means for attaching means to activate said sound generating mechanism; said housing also containing electrical means to heat said housing, sound generating mechanism and sound emitting element, wherein said electrical heating means in said housing consists of at least one electrically energized heating cartridge inserted into said housing in a channel provided therefor in said housing; said housing further containing an electrical switching means to turn said heating means on and off, wherein said electrical switching means further includes a temperature sensor enabling said electrical switching means to automatically turn said heating means on and off at predetermined temperatures as sensed by said temperature sensor; and electrical energy means to energize said heating and switching means.

2. The horn apparatus of claim 1, wherein said sound generating mechanism in said housing is a vibratable diaphragm.

3. The horn apparatus of claim 1, wherein, said sound emitting mechanism is a flared metallic trumpet.

4. The horn apparatus of claim 1, wherein said housing is to be made of a structurally strong, good heat conducting metal.

5. The horn apparatus of claim 2, wherein said diaphragm is to be an approximately flat plastic disk.

6. The horn apparatus of claim 5, wherein said diaphragm is to be made of high density polypropylene.

7. The horn apparatus of claim 2, wherein said means for attaching comprises a gas valve port that admits compressed gas to activate said diaphragm.

8. The horn apparatus of claim 7, wherein said gas valve port is a compressed air valve port to which can be attached a compressed air valve.

9. The horn apparatus of claim 1, wherein said electrical heating means in said housing consists of at least one electrically energized heating foil inserted in a channel provided therefor in said housing.

10. The horn apparatus of claim 1, wherein said temperature sensor consists of at least one thermistor inserted into a channel provided therefor in said housing.

11. The horn apparatus of claim 1, wherein said electrical switching means includes a negative thermal coefficient microprocessor switch.

12. The horn apparatus of claim 1, wherein said means to energize said heating and switching means consists of an electrical power supply apparatus of a vehicle.

13. The horn apparatus of claim 1, wherein said housing includes a base which contains at least one moisture drain channel and drain hole to carry out fluids accumulating in said housing.

14. The horn apparatus of claim 1 further comprising an operator controlled electrical switch to enable a vehicle operator to activate said switching means and heating means of said horn apparatus.

* * * * *